3,554,743
ELECTROPHOTOGRAPHIC REPRODUCTION
PROCESS USING LINEAR POLYAMIDES
AS THE PHOTOCONDUCTOR

Keith Allan Maas, Glen Mills, Pa., assignor to E. I. du Pont de Nemours and Company, Wilmington, Del., a corporation of Delaware
No Drawing. Filed Oct. 2, 1967, Ser. No. 671,996
Int. Cl. G03g 5/06, 13/22
U.S. Cl. 96—1.5
12 Claims

ABSTRACT OF THE DISCLOSURE

An electrophotographic reproduction process wherein the organic photoconductor is a linear, aromatic polyamide having recurring units of

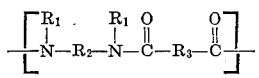

wherein $R_1$ is hydrogen or a lower alkyl, $R_2$ and $R_3$ are the same or different divalent hydrocarbon radicals at least one of which is a substituted or unsubstituted, phenyl or polyphenyl, divalent aromatic radical. The polyamide or copolymer thereof is the sole photoconductor.

BACKGROUND OF THE INVENTION

Field of the invention

This invention relates to electrophotographic reproduction wherein the electrophotographic material contains as the essential constituent a photoconductive layer which consists primarily of an organic polymeric photoconductive substance.

Description of the prior art

The invention involves the use of materials which are insulators in the dark but which become partial conductors when irradiated. These materials respond to radiant energy, being relatively conductive whenever they are irradiated and again becoming insulating when the energy is removed. Materials which exhibit this type of variable conductivity, which is dependent on the intensity of radiation, are called photoconductive insulating materials or simply photoconductors. Organic materials which are highly conjugated exhibit some slight degree of photoconductivity and are old in the art as is indicated in Dessauer & Clark, Xerography, The Focal Press, New York, 1965, pp. 169–199. A variety of inorganic semi-conductive elements are also known photoconductors, i.e. amorphous selenium, sulfur, zinc oxide etc. Suitable inorganic photoconductors are disclosed in U.S. 2,663,636. Generally, most of the photoconductors disclosed in the prior art, including known polymers, have not been highly acceptable in electrostatic imaging because their photoconductive characteristics do not permit the degree of sensitivity required in a reproduction process. Although vitreous selenium has found commercial success, it has certain disadvantages. These include:

(1) rigidity and brittleness,
(2) delicate surface sensitivity to scratches,
(3) short useful life due to very low corrosion resistance and sensitivity to mild heating,
(4) insufficient reproduction qualities for half tones, i.e. insufficient resolution, and,
(5) poor continuous tone reproduction qualities.

Furthermore, prior art photoconductors are opaque and cannot be used to form transparencies. It has been found that these disadvantages can be overcome by using photoconductors as disclosed herein.

SUMMARY OF THE INVENTION

This invention, in its broader aspects, relates to an electrophotographic reproduction process and element in which the sole photoconductive polymer is a linear polymerized polymaide or copolymer thereof. The "linear polyamide" within the scope of this invention has the recurring units of —CONR$_1$— which link together the recurrent bivalent radicals in the linear polymeric chain. The polyamide has the recurring units of

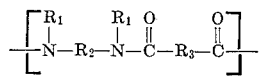

wherein $R_1$ is hydrogen or a lower alkyl, $R_2$ and $R_3$ are the same or different divalent hydrocarbon radicals at least one of which is a substituted or unsubstituted, phenyl or polyphenyl, divalent aromatic radical. The polyamides should have a potential of about 0.25 to 10 kilovolts per 0.001 inch thickness and an inherent viscosity of at least 0.1 measured as a 0.5% solution in concentrated sulfuric acid at 30° C.

The copolymers referred to in this invention define polymers where more than one different diamine or more than one different dicarboxylic acid or mixtures of said amines and said acids are reacted together.

When practicing this invention, the linear polymeric photoconductive layer which is a polyamide or copolymer thereof, is carried on a support or is a self-supporting photoconductive insulating layer and is given a surface electrostatic charge. The charged surface is given a conventional exposure to produce an electrostatic latent image. The photoconductive property of the linear polymeric layer causes the conductivity to increase in the exposed areas, to an extent dependent on the intensity of exposure, whereby the surface charge in the exposed area is partially or wholly dissipated leaving the total charge located only in the unexposed areas. This electrostatic latent image can be developed by conventional means, e.g., by the use of electroscopic powder. The developer image may be viewed directly or transferred to a receptor, e.g., paper, with volatile solvents or by applying an electric field. In addition to the conventional methods of exposure, the photoconductive polymer may be given an X-ray exposure and developer as above, resulting in an image corresponding to the X-ray beam. Likewise, as indicated herein, the photoconductive polymer can be used to produce a transparency which may be either a continuous tone or half-tone reproduction.

DESCRIPTION OF THE PREFERRED EMBODIMENTS

When practicing this invention, a preferred method of carrying out the invention comprises the steps of applying an electrostatic charge to the surface of the photoconductive polymer and projecting a radiant image thereon so as to produce an electrostatic latent image corresponding to the original, developing the latent image by means of an electroscopic powder, and fixing the developed image on the surface of the photoconductive polymer or transferring the image to a receptor and fixing the image thereto.

When practicing one embodiment of this invention, a 0.0005-inch-thick polyamide film such as poly(metaphenylene isophthalamide) is prepared as in Example I, U.S. 3,094,511. This self-supporting polyamide film may be grounded to an electrically conductive plate e.g., a chromium-plated steel plate which may be wet with a suitable liquid, e.g., isopropanol. The polyamide film is rubbed or squeegeed to remove air bubbles and excess liquid. The polymer surface is then charged with a conventional corona discharge device until the surface potential of the photoconductive polyamide film is 0.25 to 10.0 kv./0.001 inch, preferably 1–2 kv./0.001 inch wherein kv./0.001 inch represents surface charge/film thickness A transparency is then placed face down on the charged polyamide and exposed as disclosed herein and in such a manner as to cause the charge in the exposed areas of the photoconductive polyamide to partially or completely dissipate while the unexposed areas retain the surface charge. Depending upon the type of electromagnetic radiation source used, the exposure time can vary from as little as 1/500 second up to 60 seconds or more. The exposed photoconductive polymer containing a latent electrostatic image is then developed by any of the conventional methods used in electrophotography. Preferably, a toner-petroleum distillate developer bath containing commercially available toner in a concentration of about 1:100 is used as the developer. The exposed photoconductive polymer is preferably developed in the bath for 10 seconds or less. An image appears on the surface of the photoconductive polymer film. This image may then be fixed as indicated herein, or transferred to a receptor surface.

When transferring the developed image from the photoconductive polyamide film, it is preferable to place the receptor sheet in contact with the developed image on the polymer film/plate arrangement and submit the sandwiched arrangement to a corona discharge. When the receptor is removed, a permanent image corresponding to the original appears on the receptor sheet. The polymer film may be recharged and reused. Other embodiments of the invention include exposing the charged photoconductive polymer to X-ray beams and obtaining an image corresponding to such beams; continuous tone imaging and copying processes, and for making positive and negative transparencies.

The photoconductive polymer layer may vary in thickness from 0.00001 inch to 0.01 inch. It is preferred to use the thinner layers, i.e., 0.0001-inch to 0.002-inch because the rate of discharge during imaging is faster and better image resolution is obtained. Furthermore, the high fields necessary to charge the layer are more easily attained across the thin layers by comparatively low voltage equipment. The thinness of the layer is practically limited by porosity or pin-holing of the photoconductive polymer surface.

The polyamides useful in the present invention include polymer compositions of

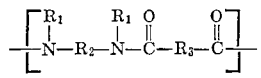

wherein $R_1$, $R_2$, and $R_3$ are defined as previously indicated. Preferably, both $R_2$ and $R_3$ are substituted or unsubstituted, phenyl or polyphenyl, divalent aromatic radicals although satisfactory results are achieved if either $R_2$ or $R_3$ is the aromatic radical while the remaining member is a divalent alkyl radical of generally 2 to 15 carbon atoms.

The polyamides useful within the scope of this invention include the linear, polymerized, reaction products of diamines and polybasic carboxylic acids, preferably the dicarboxylic acids.

The carboxylic acids as used herein are defined to include the conventional acids containing carboxylic groups, i.e., —COOH—, as well as the carboxylic acid anhydrides, acid chlorides, and related functional derivatives.

Either $R_2$ or $R_3$, preferably both, are aromatic divalent radicals selected from:

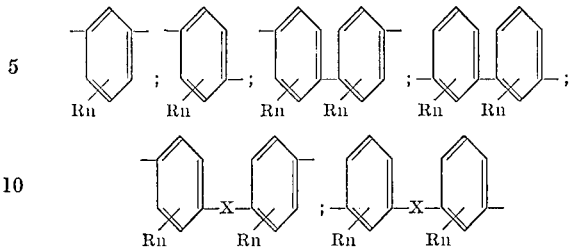

in which R is a lower alkyl, lower alkoxy, or halogen group, $n$ is a number from 0–4, inclusive, and X is an alkylene of 1–3 carbon atoms, oxygen, sulfur, or one of the following:

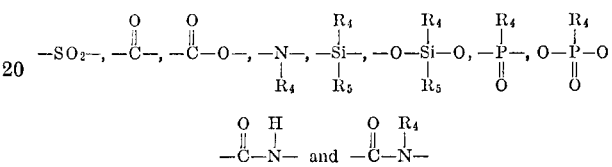

wherein $R_4$ and $R_5$ are alkyl or aryl, and substituted groups thereof.

Specifically, the polyamides are of organic diamines and polybasic carboxylic acids, the diamines having the formula $H_2N$—$R_2$—$NH_2$, where $R_2$ is preferably an aromatic phenyl or polyphenyl radical such as phenylene, biphenylene, etc., or

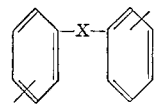

wherein X is defined as above. If an aromatic polybasic carboxylic acid is used, the $R_2$ in the diamine may be a divalent, acyclic hydrocarbon radical such as ethylene, trimethylene, tetramethylene, isopropylene, isobutylene, etc.

Among the diamines suitable for use in the present invention are: meta-phenylenediamine; paraphenylenediamine; 2,2-bis(4-aminophenyl)propane; 4,4'-diaminodiphenylmethane; 4,4' - diaminodiphenyl sulfide; 4,4' - diaminodiphenyl sulfone; 3,3'-diaminodiphenyl sulfone; 4,4'-diaminodiphenyl ether; 2,6-diaminopyridine; bis(3-aminophenyl)diethylsilane; benzidine; 3,3'-dichlorobenzidine; 3,3'-dimethoxybenzidine; bis(4-aminophenyl)ethylphosphine oxide; 4,4'-diaminobenzophenone; bis(4-aminophenyl)phenylphosphine oxide; N,N-bis(4-aminophenyl)butylamine; N,N - bis(4 - aminophenyl)methylamine; 3,3'-dimethyl-4,4'-diaminobiphenyl; 3,4'-diaminobenzanilide; 4-aminophenyl-3-aminobenzoate; 2,4-bis (beta-amino-t-butyl)-toluene; bis(p-beta-amino-t-butylphenyl)ether; p-bis- 2-(2-methyl-4-aminopentyl)benzine; p-bis(1,1-dimethyl-5-aminopentyl)benzene; m-xylenediamine; p-xylene diamine; N,N-bis(4-aminophenyl)phenylamine; and mixtures thereof.

Operable carboxylic acids include terephthalic acid, isophthalic acid, 4,4'-diphenyl dicarboxylic acid, bis(4-carboxyphenyl)ether, bis(3-carboxyphenyl)sulfone, bis(4-carboxyphenyl)methane, 4,4'-benzophenone dicarboxylic acid, adipic acid, sebacic acid, cyclohexane-1,4-dicarboxylic acid, alkoxy isophthalic acid, alkoxy terephthalic acid, glutaric acid, pimelic acid, isophthaloyl chloride, lower alkyl isophthaloyl chlorides, etc.

Other useful polybasic carboxylic acids and diamines and methods of preparation of the polyamides are described in U.S.P. 2,130,948; 2,244,192; 2,902,475; and 3,094,511.

The photoconductive polyamides may be employed in the form of a self-supporting film or as a coating on a support. In either case, one side of the photoconductive polymeric layer is preferably in contact with an electrically conductive surface during charging of the photoconductive polymer surface. If the photoconductive polymer is a self-supporting film, the film may be metallized on one side or laminated to a metal foil such as aluminum, silver, copper, nickel, etc. Alternatively, the polymer may be brought into electrically conductive contact with a conducting layer. To insure good contact of the photoconductive film with the conducting layer, the film surface in contact with the conducting layer may be wet with a liquid such as water or an organic liquid, e.g., ethanol, acetone, etc.

When the photoconductive polymers of this invention are coated on the surface of a support, the polymer may be applied in any of the conventional forms, e.g., spraying, brushing, coating, etc. The polymer is generally applied as a solution in a suitable solvent but may also be applied as an aqueous dispersion or from a melt. Also, the polymer when applied to the support need not necessarily be a prepolymerized substance. Mixtures of monomers or blends of monomers and polymeric substances may be applied to the conductive surface of the support and then polymerized by any of the methods well known in the art.

As indicated previously, the photoconductive polymer in the form of a self-supporting film or a coating is preferably in contact with an electrically conductive surface. The electrically conductive surface may be a plate, sheet, or layer whose specific resistivity is smaller than that of the photoconductive layer, i.e., in general smaller than $10^9$ ohm. cm., preferably $10^5$ ohm. cm. or less. Suitable supports include metal sheets, e.g., iron, aluminum, copper, etc., insulators such as glass, plastic film, paper, polyesters, etc. coated on at least one side with a conductive coating. The conductive coating may be a layer of metal, e.g., aluminum, tin, silver, etc., or highly electrically conductive coatings of binder agents, e.g., polyvinyl alcohol, glycols, etc.

Suitable conductive plates include plates of aluminum, zinc, copper, tin, etc.

Suitable conductive sheets include films made of polyurethane, polyvinyl alcohol, etc.

Paper supports may also be satisfactorily used with limitations of conductivity as indicated above. Such papers may in themselves be electrically conductive or carry surface coatings which render them electrically conductive.

The surface of the photoconductive polymer can be charged for image retention according to any of the conventional techniques known in electrophotography. These include corona discharge, contact charge, discharge of a capacitor, etc. Suitable corona charging devices are described in U.S.P. 2,777,957 and 2,836,725. The charging of the free surface of the photoconductive polymer is preferably carried out in the dark or in subdued illumination. The preferred polymers of this invention are generally charged at a field gradient of 1–10 kv./0.001 inch negative potential. Either negative or positive potential can be used, though negative potential is preferred when positively-charged developers are used. Polymer surface potentials as low as 0.5 kv./0.001 inch give good results. During charging, the electrically conductive surface of the support or the electrically conductive surface on which the self-supporting polymer may be resting must be grounded. Such grounding is not required during imaging of the charged photoconductive polymer.

Electrophotographic polymers of this invention can be used in varous reproduction techniques wherein different types of radiation are used. Electromagnetic radiation including ultraviolet, visible, X-rays, infrared, high energy electrons and nuclear radiations can all be employed to expose the charged photoconductive polymers of this invention. When using an actinic radiation source, the charged photoconductive polymer of the preferred thicknesses disclosed herein can be given camera speed exposures of 1/500 second and satisfactory developable images produced. Many of the polymers absorb some radiation throughout the visible range of the spectrum and so are sensitive between 400–700 m$\mu$. Ultraviolet response appears to increase toward the far ultraviolet wavelengths. Satisfactory images are also obtained when the polymers of this invention are charged and exposed to X-rays as indicated in the examples. Images on charged photoconductive polymer surfaces can also be obtained using electron bombardment techniques.

Within the scope of exposure techniques of this invention, reflection exposure can be used to produce satisfactory reflex copies. This technique is further illustrated by the examples.

When the charged, photoconductive polymers of this invention are exposed imagewise to electromagnetic radiation the exposed areas are discharged leaving the unexposed areas charged. This electrostatic latent image can then be converted into a visible image according to conventional electrophotography development techniques. Suitable developers include charged aerosols, powders, or liquids containing finely divided, colored substances which are attracted to the charged image areas. Preferably, the latent image is developed by contacting it with a developer consisting of a carrier and a toner, suitable carriers being small glass balls, iron powder, plastic balls, or a low boiling dielectric liquid. The toner is generally a resin-pigment mixture with a grain size of about 1–100$\mu$.

The developed image may then be transferred to receptor sheets for as many as four or more transfers without reexposing or retoning the image. The image may be retoned and further copies obtained. If desired, the image can be fixed on the surface of the photoconductive polymer, after development, by any of the conventional methods in electrophotography, i.e., heating or as disclosed in British Patent 658,699.

Various modifications can be practiced within the scope of this invention. For instance, if a self-supporting film is used as the photoconductive polymer layer, both a negative and positive image can be obtained. When the film is charged, the top surface of the polymer carries a charge which is the opposite of the charge on the bottom surface of the polymer film. If the photoconductive film is negatively charged on the top surface and then exposed to a positive master, the charge in the exposed areas is dissipated on both the top and bottom surface of the film. If a positive developing toner is used, the top surface of the film which is negatively charged in the unexposed areas will attract the positive developer to produce a visible positive image. On the bottom side of the film the unexposed areas will be positively charged and when developed with a positive developer, a negative image is observed. Either or both of these images may be transferred. Similar results can be obtained by charging the top surface of the film either negatively or positively and selecting a developer of like charge.

The electrophotographic images of this invention can be transferred to a conventional hydrophilic base, and transformed into a printing plate. The printing plate can be mounted on an offset printing press, inked and copies produced. The developed images may also be transferred to a conventional offset master and the master used to obtain conventional offset copies.

Electrophotographic materials according to the present invention can be used in any of the different techniques which are based on the exposure and discharge of an electrostatic charge in or on a photoconductive surface.

The following examples will further illustrate but are not intended to limit the scope of this invention.

Example 1.—A 0.0015-inch-thick polyamide film of 3,3'-dicarboxyazobenzene and bis(4-aminophenyl)sulfone was prepared as described in U.S. 2,244,192 except that the polymer was cast into a film as in Example 30, U.S. 3,094,511. The film was placed on a smooth-surfaced, 0.01 inch thick, chromium-plated steel plate which had been wetted with isopropanol. All air bubbles were removed by pressing across the film with a hard rubber squeegee. The excess isopropanol was then wiped off with a paper towel. This sandwiched arrangement was then passed film side up, under two parallel, 0.003-inch-diameter tungsten wires of a conventional corona discharge apparatus. The wires were surrounded at a distance of approximately eight millimeters by an aluminum semicircular shield. The wires were connected to the negative output of a Spellman Lab-10 high voltage power supply. The metal plate and aluminum shield were at zero potential and the polyamide film was charged to a surface potential of 1 kv./0.001 inch. A positive, continuous tone transparency and glass plate were consecutively placed on top of the film and exposed to a 500-watt photoflood lamp at a distance of 3 inches, for two seconds. The lamp, glass, and transparency were removed and the exposed polymer surface sprayed with a conventional, commercially available, xerographic dry toner. A good positive, reverse-reading image appeared on the film after one to two passes with the toner. This image was transferred to a sheet of white bond paper by placing the paper over the image on the film and passing the sandwiched arrangement beneath the corona discharge wires as above. The wires were supplied with 3.5 kv. The paper was removed from the film and a right-reading, positive, high resolution image of the transparency appeared on the sheet. The image resisted smudging.

Example 2.—Example 1 was repeated except that the diamine was bis(4-aminophenyl)ether. Results similar to those of Example 1 were obtained.

Example 3.—Example 1 was repeated except that the polymer surface was wiped clean with a paper towel after transfer of the image to the receptor paper. The entire process of charging the polymer surface, exposing, developing, and transferring the image was repeated a number of times without any change in image quality.

Example 4.—Example 1 was repeated except that the charged, exposed polyamide film was removed from the chromium-steel plate prior to development. The film was then placed in a developer bath of a commercially available xerographic developer containing a carbon black developer in a hydrocarbon petroleum distillate at a concentration of 1:100. A negative, right-reading image appeared on the bottom surface (the one in contact with the steel plate) of the film. The developed film was sandwiched between two sheets of paper and the sandwich placed on the metal plate. The images were then transferred by use of the corona discharge as in Example 1. One sheet contained a positive, right-reading image from the top surface of the film, and the other sheet carried a negative, reverse-reading image from the opposite side of the film.

Example 5.—A 0.0025-inch-thick copolyamide film based on meta-phenylendiamine and a 70:30 ratio of isophthalic and terephthalic acids was prepared as disclosed in U.S.P. 2,902,475. The film was bonded to an aluminum plate and the charged, exposed, and developed as in Example 1. A positive image appeared on the film surface after development and was transferred as in Example 1.

Example 6.—Example 1 was repeated except that the polyamide film and plate were placed in the focal plane of a graphic press camera (f/4.5 lens) after charging of the film. The photoconductive polyamide film was exposed for 5 seconds at 60 cm. from a printed image to the lens while illuminating the printed image with a Sylvania Sun Gun II, SG 55, set at 60 cm. A good positive image was developed and transferred to white bond paper as in Example 1. A good, positive, high resolution, right-reading image appeared on the paper and was a 10.5× area reduction of the original.

Example 7.—Example 1 was repeated except that the polyamide film was bonded as in Example 1 to a 0.003-inch-thick aluminum sheet. The element was charged as in Example 1 except that the voltage to the tungsten wires was 15 kv. and the distance between the film sample and the wires was one inch. The charged sample, while still on the aluminum base was then exposed to a 16 kv., 7.8 mµ. X-ray beam, approximately four inches from the source, for one second or more. The exposed elements were developed for five seconds in a developer bath of a commercially available xerographic toner in a petroleum hydrocarbon distillate at a concentration of 1:100. A positive image of the beam appeared on the film. The film was then heated to permanently fix the developed images. Low level lights were used through the entire process.

This invention offers the advantage of being able to obtain high resolution of half-tone dots and continuous tone images. Copies of images are of the same quality as silver halide reproductions. Such reproductions can be obtained without the use of special imaging and development equipment.

The use of continuous tone devices has not been accepted in industry because of various drawbacks such as expensive equipment additions to existing devices. It has been found that this invention overcomes these drawbacks and can be successfully used in commercial continuous tone copying process. The elements of this invention can be used in photogravure process. Because of these high quality copying characteristics, the photoconductive polymers of this invention can be used in photofinishing operations.

The process of this invention employs photoconductors which are tough, durable, flexible and transparent. The polymers form homogeneous layers which require no additional binding agents or other substances to render them photoconductive. If desired, conventional binding agents may be used but they are not required. The polymers offer the further advantage that they may be used as self-supporting films. Such films can be used to prepare dual images, i.e., an image on each side of the film. The polymers are abrasion and scuff resistance, have good thermal stability and resist fatigue by heat and light. The polymers will accurately copy large solid dark areas as well as areas of gradually changing tone value. In short, the photoconductive polymers used in this invention provide in a single material, a combination of desirable features not heretofore possessed by any known photoconductor.

The embodiments of the invention in which an exclusive property or privilege is claimed are defined as follows:

1. In a process for image reproduction from a photoconductive element comprising imagewise exposing said element to produce an electrostatic latent image and developing said image, the improvement which comprises effecting said process utilizing a photoconductive element wherein the sole latent image-forming material consists essentially of a uniformly electrostatically charged polyamide stratum, said polyamide being of recurring units of

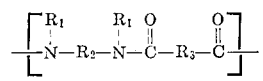

where $R_1$ is hydrogen or lower alkyl, $R_2$ and $R_3$ are (a) substituted or unsubstituted phenyl or polyphenyl divalent aromatic radicals or (b) a divalent alkyl radical of no more than 15 carbon atoms, with the proviso that at least one of said groups $R_2$ or $R_3$ be said divalent aromatic radical.

2. A process as in claim 1 where said polyamide has an inherent viscosity of at least 0.1 measured as a 0.5% solution in concentrated sulfuric acid at 30° C.

3. A process as in claim 1 where said latent image is developed by contacting said image with a toner composition.

4. A process as in claim 1 where said polyamide has a potential of about 0.25 to 10 kilovolts per 0.001 inch thickness.

5. A process as in claim 4 where said polyamide is in integral contact with a support whose contacted surface has a specific resistivity of less than $10^9$ ohm. cm.

6. A process as in claim 4 where said polyamide has a thickness of from 0.00001 to 0.01 inch.

7. A process as in claim 4 where said developed image is placed in contact with a support and said image is transferred to said support by exposure to an electrostatic charge.

8. A photoconductive element having as the sole latent image-forming photoconductive material a uniformly electrostatically charged polyamide stratum having a surface potential of 0.25–10.0 kv./0.001 inch thickness, said polyamide being of recurring units of

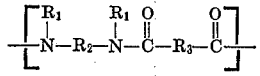

where $R_1$ is hydrogen or lower alkyl, $R_2$ and $R_3$ are (a) substituted or unsubstituted phenyl or polyphenyl divalent aromatic radicals or (b) a divalent alkyl radical of no more than 15 carbon atoms, with the proviso that at least one of said groups $R_2$ or $R_3$ be said divalent aromatic radical.

9. An element as in claim 8 where said polyamide has an inherent viscosity of at least 0.1 measured as a 0.5% solution in concentrated sulfuric acid at 30° C.

10. An element as in claim 8 where said polyamide has a potential of about 1.0 to 2.0 kilovolts per 0.001 inch thickness.

11. An element as in claim 10 where said polyamide is integral contact with a support whose contacted surface has a specific resistivity of less than $10^9$ ohm. cm.

12. An element as in claim 11 where said polyamide has a thickness of from 0.00001 to 0.01 inch.

References Cited

UNITED STATES PATENTS

| | | | |
|---|---|---|---|
| 3,094,511 | 6/1963 | Hill et al. | 260—78 |
| 3,169,060 | 2/1965 | Hoege | 96—1 |
| 3,240,597 | 3/1966 | Fox | 96—1 |
| 3,390,987 | 7/1968 | Tomanek | 96—1.5 |

GEORGE F. LESMES, Primary Examiner

J. C. COOPER III, Assistant Examiner

U.S. Cl. X.R.

96—1; 117—17.5; 260—78